United States Patent
Bari et al.

(10) Patent No.: US 8,472,371 B1
(45) Date of Patent: Jun. 25, 2013

(54) ROAMING SUPPORT FOR WIRELESS ACCESS SUBSCRIBER OVER FIXED IP ACCESS NETWORKS

(75) Inventors: Farooq Bari, Bothell, WA (US); Q. James Hu, Sammamish, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 1360 days.

(21) Appl. No.: 11/677,508

(22) Filed: Feb. 21, 2007

(51) Int. Cl.
  H04W 4/00     (2009.01)
  H04W 36/00    (2009.01)
  H04L 12/28    (2006.01)
  G06F 15/16    (2006.01)

(52) U.S. Cl.
  USPC ............ 370/328; 370/351; 455/439; 455/461

(58) Field of Classification Search
  USPC .......................................................... 380/258
  See application file for complete search history.

(56) References Cited

U.S. PATENT DOCUMENTS

| | | | |
|---|---|---|---|
| 6,856,676 B1* | 2/2005 | Pirot et al. | 379/201.01 |
| 6,910,074 B1* | 6/2005 | Amin et al. | 709/227 |
| 7,174,018 B1* | 2/2007 | Patil et al. | 380/258 |
| 2002/0075844 A1* | 6/2002 | Hagen | 370/351 |
| 2003/0108033 A1 | 6/2003 | Raisanen et al. | |
| 2006/0165103 A1* | 7/2006 | Trudeau et al. | 370/401 |
| 2008/0002576 A1 | 1/2008 | Bugenhagen et al. | |
| 2008/0049626 A1 | 2/2008 | Bugenhagen et al. | |

OTHER PUBLICATIONS

OA dated Mar. 22, 2011 for U.S. Appl. No. 11/736,044, 19 pages.

* cited by examiner

*Primary Examiner* — Melody Mehrpour
*Assistant Examiner* — Natasha Cosme
(74) *Attorney, Agent, or Firm* — Turocy & Watson, LLP

(57) ABSTRACT

The claimed subject matter provides for systems and methods that facilitate a transfer of a portion of a service-level policy agreement associated with a home wireless access network to a fixed internet protocol (IP) access network. An authentication component can authenticate a subscription of a multi-mode device across different network architectures. A policy component can provide at least a portion of a service-level policy agreement to enable or disable services or policies associated with a multi-mode device at the fixed IP access network on a per session basis.

24 Claims, 10 Drawing Sheets

ROAMING SUPPORT FOR WIRELESS ACCESS SUBSCRIBER OVER FIXED IP ACCESS NETWORKS

TECHNICAL FIELD

The subject innovation relates to facilitating communication in converged network systems, and more specifically, to bridging service-related policies between fixed IP access networks and wireless access networks.

BACKGROUND

The mobile telephone industry has been associated with tremendous growth over the last several years. The number of consumers utilizing mobile devices (e.g., mobile phones, personal digital assistants (PDAs), any suitable user equipment for communciation, and the like) has increased sharply, making the mobile industry a large consumer driven market, and consequently leading to competition amongst mobile service providers. One factor distinguishing the services of competing providers has been technical capabilities associated with a device. For instance, today's mobile devices have progressed in technical capabilities to a point where many can be utilized as full-service computing mechanisms. For example, applications such as word processing software, web browsing software, electronic mail software, accounting software, and various other types of software are typical on modern devices. The gap between traditional computing mechanisms and mobile communication devices has lessened with the introduction of such applications.

The advent of computing applications integrated onto mobile devices led naturally to further bridging a gap between such devices and capabilities traditional to networked personal computers (PCs). Along similar lines, networked computers began developing characteristics traditionally associated with mobile communication devices, specifically, a capability to exchange high quality voice communication, worldwide. The technology supporting voice exchange between computers integrated via fixed internet protocol (IP) networks became known as voice over internet protocol (VoIP). Moreover, the addition of wireless routing technologies with fixed IP networks enabled small, hand-held devices to carry VoIP exchange with other devices. Not long after, communication devices incorporated a dual capability to access both fixed IP networks (sometimes termed fixed IP access networks, collectively) and mobile networks (sometimes termed wireless access networks, collectively).

The trend toward integration of wireless access and fixed IP access capabilities in a single portable device has been termed the 'fixed/mobile convergence'. In essence, the fixed/mobile convergence has led to a rapid change in the communication industry as different communication architectures incorporate capabilities traditionally associated with others so that their services do not become technologically obsolete. However, some distinctions still remain amongst the disparate communication architectures, for example, in regard to network access and communication qualities of service.

A wireless access network can provide quality of service (QoS) parameters for communication through "roaming" agreements. Roaming among wireless access networks occurs when a device having a subscription with a first wireless access provider accesses and uses facilities of a second wireless access provider. The second provider has no existing agreement associated with the device, but can provide communication services to the device based on an agreement between the two providers instead. Consequently, a wireless access device can carry its service subscription information across access points, networks and even operator domains. A fixed IP access network can provide quality of service (QoS) capabilities for communication related to a fixed access billing account. Users deciding to use the access point can therefore receive such qualities of service specified in the fixed access billing account. As with most things related to fixed/mobile convergence, however, some of the remaining distinctions between fixed IP access and wireless access networks have also begun to fade as providers continue to compete for shares of the mobile communication market.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

Systems and methods are provided that facilitate data exchange between a fixed internet protocol (IP) access network and a multi-mode device, where at least a portion of a service-level policy agreement related to the multi-mode device can be provided to the fixed IP access network. Providing such an agreement can enable regulation of service-level policies related to per session data exchange. Conventionally, no mechanism exists to transfer service-level policy information between a fixed IP access network and, for example, a wireless access network. Consequently, wireless access policies related to a multi-mode device cannot be enabled at a fixed IP access network. The disclosed systems and methods include components that facilitate a transfer of a portion of a service-level policy agreement between a home wireless access network and the fixed IP access network. In general, the multi-mode device can form a communication link to multiple communication network architectures (e.g., a wireless access network and a fixed IP access network) by way of multiple access technologies and can include, e.g., a communication device, a mobile device, a mobile communication device, a device that connects to the fixed IP access network, a smart-phone, and so forth.

In accordance with aspects of the claimed subject matter, systems and methods are provided that can automatically authenticate a multi-mode device as a wireless access subscriber upon a fixed IP access network receiving data related to the multi-mode device. An authentication component can provide identification data related to a service-level policy agreement associated with a home network and a multi-mode device. Further, the authentication component can receive a verification or denial of a service-level policy agreement from the home wireless access network.

In further related aspects of the claimed subject matter, methodologies are disclosed for dynamically negotiating a service level agreement (SLA) between a fixed IP access network and a wireless access network. An SLA can specify service-level policies specific to a multi-mode device or group of multi-mode devices regulating per session information exchange. The service-level policies can be applied to communication between such device or group of such devices associated with a first network architecture (e.g. a wireless access network) and a network of a second architecture (e.g. a fixed IP access network). In a particular aspect, methods are provided that receive identification information related to a multi-mode device, forward the identification information to a home network associated with the multi-mode device, receive authentication verification or denial, and establish service-level policies based on the verification or denial of authentication.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
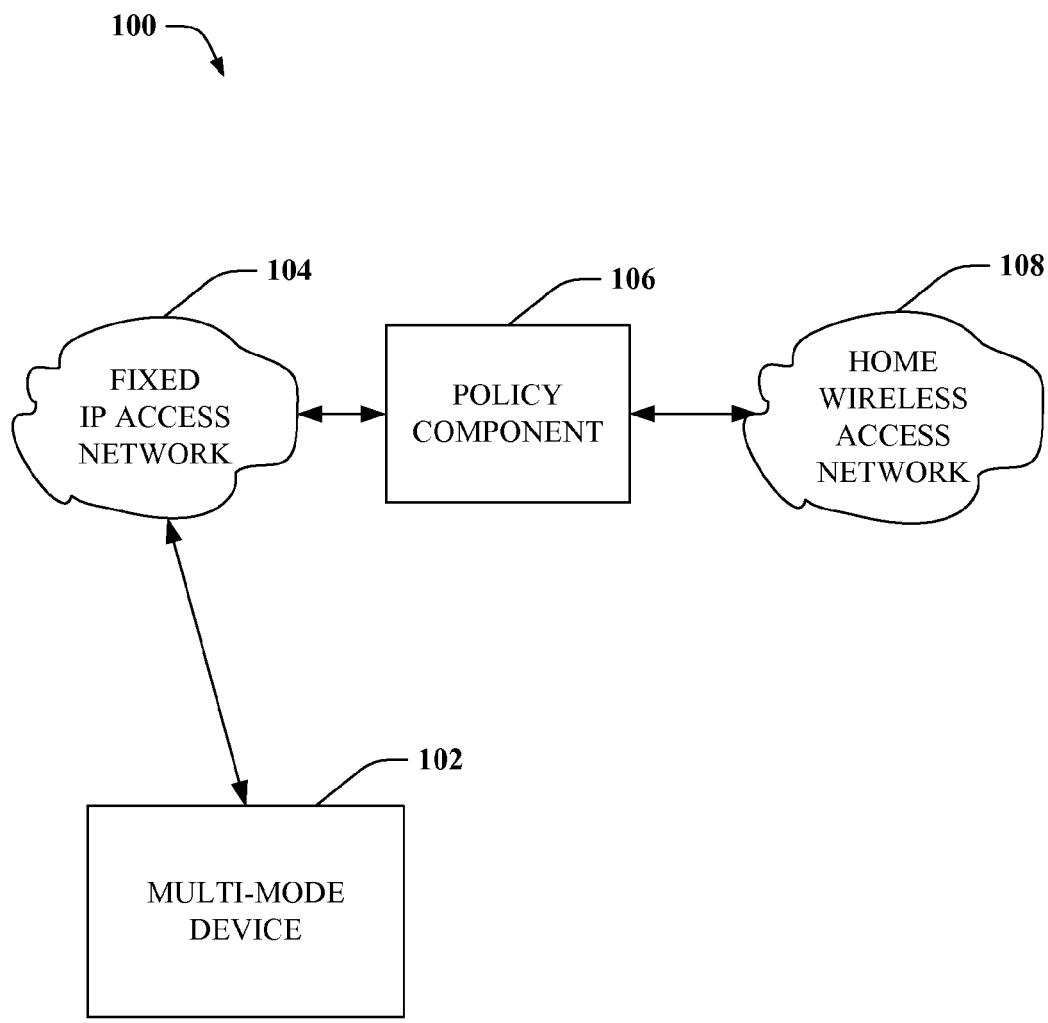
FIG. 1 illustrates a block diagram of an example system that provides service-level policies related to a multi-mode device to a fixed internet protocol (IP) access network in accordance with an aspect of the subject innovation.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As used in this application, the terms "component," "system," "equipment," "network," and the like are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, and the like), optical disks (e.g., compact disk (CD), digital versatile disk (DVD), etc.), smart cards, and flash memory devices (e.g., card, stick, key drive, and the like). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

FIG. 1 illustrates a system 100 that can establish service-level policies between a fixed IP access network and a multi-mode device in accordance with an aspect of the subject innovation. The system 100 can include a network of a first architecture (e.g. fixed IP access network 104) and a multi-mode device 102 associated with a network of a second architecture (e.g. a wireless access network 108). Multi-mode device 102 has data related therewith, wherein at least a portion of the data is received at fixed IP access network 104. Such data can include identification data that uniquely classifies and associates multi-mode device 102 with a service-level policy agreement associated with a home wireless access network 108. In particular, the data can be authentication data such as, but not limited to, a user ID, device serial number, device identification number, device MAC address, consumer data (e.g. consumer address, name, billing information, credit card information, etc.), and/or any like data that can uniquely identify a device or consumer associated with a device.

To illustrate by way of an example, upon initiating data transfer or otherwise registering a multi-mode device, a fixed IP access network can automatically receive identification data and initiate acquisition of at least a portion of a service-level policy agreement associated with the multi-mode device. A policy component 106 can facilitate information exchange between fixed IP access network 104 and a home wireless access network 108, wherein home wireless access network 108 contains service-level policy information associated with multi-mode device 102. Such communication can assist fixed IP access network 104 in identifying and establishing service-related policies between multi-mode device 102 and fixed IP access network 104.

Policy component 106 can be located proximate fixed IP access network 104, proximate home wireless access network 108, proximate intervening networks that facilitate communication between fixed IP access network 104 and home wireless access network 108, proximate combinations of such networks, or separate from such networks. Further, policy component 106 can include physical or virtual data storage elements that can store service-level policy information associated with various multi-mode devices (e.g. multi-mode device 102). Moreover, policy component 106 can include one or more policy servers containing instruction protocols that facilitate storage, retrieval, back-up and/or recovery of data (e.g. identification data, service-level policy information, etc.) and transfer of such data between communication networks.

It is to be appreciated that polices related to information exchange are typically predetermined as part of a service-level policy agreement. Such service-level policies can include, but are not limited to, quality of service parameters, communication services, billing information, or an availability of services and/or billing related policies, or combinations thereof. Specifically, quality of service parameters can include a data transfer bandwidth, data transfer priority, and/or maximum bit rate and the like. Typical communication services include examples such as streaming video, voice over internet protocol (VoIP), e-mail, instant messaging (IM), concurrent audio, text messaging, or combinations thereof. Examples of billing information can include a predetermined monetary rate associated with a communication service, such as a rate per communication service utilized, a rate for communication minutes used, a rate for quantities of data exchanged (measured for example in megabytes of data transferred and/or received), etc. Availability can include services or policy-related billing subject to location, network access and/or access point, local regulations, etc.

A service-level policy can include limitations on access to specific media, web sites, resources, databases, etc., as provided by, for instance, local laws and/or regulations. Such limitations can be enforced on a per session basis in accord with aspects of the claimed subject matter. For example, a user traveling out of a home network area (e.g., home wireless access network 108) in the United States to another country might encounter restrictions on availability of certain commercial media. As a more specific example, if such a user, having a service-level policy agreement with a provider in the US travels abroad, to Europe, for instance, different regulations covering a movie, or particular song available on or through fixed IP access network 104 may exist. International copyright restrictions, for example, could limit availability of certain media, movies, songs, or other artistic media works released in the US but not yet released in Europe. In such case, information exchange between a fixed IP access network servicing a portion of a European nation and multi-mode device 102 could be based on that international regulation, as specified in a service-level policy obtained from home wireless access network (based in the US) obtained via policy component 106. More specifically, the information exchange can be limited so as to exclude the particular movie or song, etc. protected by international copyright laws. More broadly, policy component 106 can generally enable or disable services depending on availability, regulation, agreement, etc. applicable to a service-level policy or made between a home network and a device and/or a home network and a fixed IP access network.

It is to be further appreciated that polices related to information exchange can be particular to a multi-mode device or class of multi-mode device or a particular communication session with a multi-mode device. Moreover, such policies may vary between devices or classes of devices. For instance, devices capable of utilizing certain services (such as VoIP-only, VoIP and data transfer), utilizing levels of quality (such as minimum bandwidth, maximum bit rate, router priority, and the like), subscribed to billing different classifications (monthly rate, per-usage rate, low, mid, or high level service plans etc.), or subject to different regulations or agreements (e.g., local or national regulations affecting media, online resources, or web sites accessible by a device, or agreements between networks specifying such, or the like) or like commercial, contractual, and/or regulatory limitations or combinations thereof can all serve as basis for enabling or disabling services or other policies for a particular communication session.

System 100 includes components that can provide a service-level policy agreement associated with a multi-mode device 102 and/or a home wireless access network 108 to a fixed IP access network. Conventional network communication establishes no architecture whereby policies related to information exchange established as part of a service-level policy agreement can be provided to a fixed IP access network. In general, however, wireless access subscribers expect service-level policies purchased as part of a service-level policy agreement to be available for communication. Yet receipt of at least a portion of such policy can be necessary to effectuate such services. The subject innovation therefore establishes systems and methods for facilitating transfer of at least a part of a service-level policy agreement to a fixed IP access network. Such transfer enables a fixed IP access network to enable or disable services or other policies expected by wireless access subscribers. Consequently, the innovation provides a seamless architecture whereby service-level policies can be substantially equivalent across wireless access and fixed IP access networks.

It is to be appreciated that a fixed IP access network (e.g. fixed IP access network 104) can include all suitable networks having physical wired 'last-mile' connections to a consumer. For example, a service provider that provides a connection to a network by way of a physical, wired IP electronic connection, such as a coaxial cable line, copper telephone line, digital subscriber line (DSL), etc., to a business, home, device, or public facility, or like consumer, is considered a fixed IP access network in accord with aspects of the claimed subject matter. In addition, a network that provides access to consumers via a physical wired last mile connection terminating in a wireless communication device (e.g., an 802.11 wireless router or other suitable wireless local area network (LAN) router, or the like) is considered a fixed IP access network. To illustrate, a service provider may, for example, terminate a physical wired connection (e.g., cable, DSL, copper wire etc.) at an 802.11 WiFi wireless router and provide network access to multiple consumers via wireless communication between the WiFi router and a consumer's wireless equipment. In this instance, the connection to a consumer's home, device, place of business, facility, etc. (the 'last mile') is wired even though the network access point may provide a wireless connection. Therefore, for purposes of the subject innovation, a fixed IP access network is defined by a physical wired IP connection to a network access point as described supra, whether the access point is a wired or wireless connection (examples of which are given infra).

Fixed IP access network 104 can include logical connections to one or more remote computers such as a workstation, laptop, a server computer, a router, a personal computer, portable device, microprocessor-based entertainment device, peer device, or other like network node. Such logical connections can be facilitated via a DSL network, a cable network, an optical fiber network, including a local area network (LAN) and/or wide area network (WAN), and can further provide access to global communications networks e.g. the Internet. Furthermore, access to fixed IP access network 104 can include wired (e.g. category 4 and category 5 [CAT-4 and CAT-5 respectively] etc., IEEE 1394, IEEE 802.3 and the like, USB, etc.) connections or wireless (e.g. radio frequency [RF] including "Bluetooth", 802.11 [a, b, g, n, etc.], 802.16x and the like, microwave frequency, optical frequency, and the like) connections or combinations thereof. Additionally, it is to be appreciated that home wireless access network 108 can include global system for mobile communication (GSM) networks, time division multiple access (TDMA) networks, code division multiple access (CDMA) networks, such as IS-95 and subsequent iterations of CDMA technology, integrated digital enhanced network (iDEN) networks, universal mobile telecommunication system (UMTS) networks, UMTS VoIP networks, and other implementations of first generation (1G), second generation (2G), advanced second generation (2.5G), third generation and third generation partnership project (3G and 3GPP respectively) networks as well as like wireless access networks or combinations thereof. Further, multi-mode device 102 can be, for instance, a communication device, a mobile device, a dual-mode device, a dual-mode cellular/IP device, a mobile communication device, a cellular device that connects to the fixed IP access network, a smart-phone, a gaming device, a home media center, a portable media player, a satellite phone, a desktop device, a cellular phone, a portable gaming device, a mobile phone, a portable music player, a portable device, a laptop, a personal digital assistant, a handheld or combinations thereof, having an associated subscription with a wireless access network (e.g., home wireless access network 108).

Figure 2:
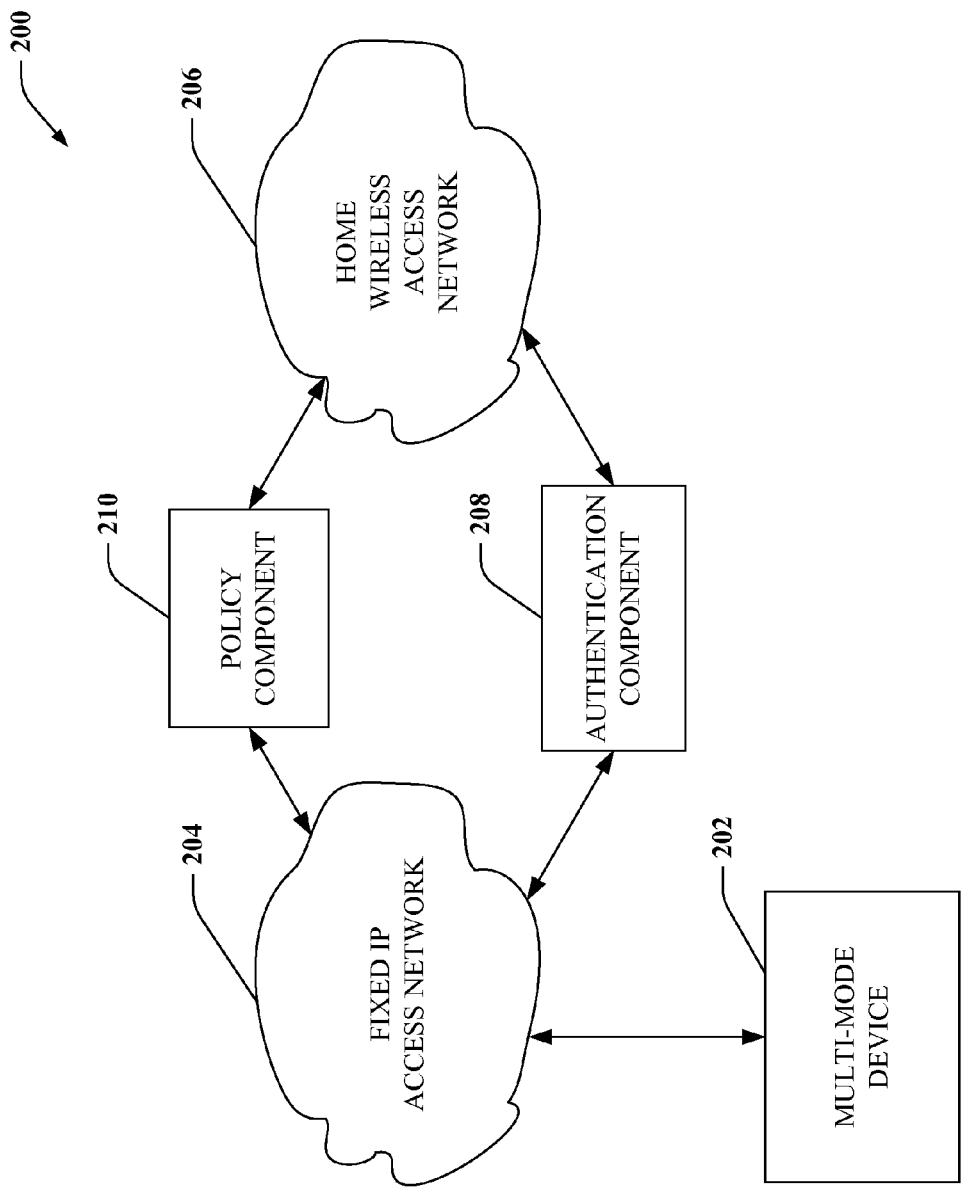
FIG. 2 depicts a block diagram of an example converged communication system in accord with aspects of the subject innovation.

FIG. 2 illustrates a converged fixed IP access/wireless access (hereinafter referred to as wireless/fixed) system 200 that can authenticate a multi-mode device 202 and transfer a service-level policy agreement (e.g., a cellular service-level agreement, or the like) in accordance with various aspects of the subject innovation. System 200 can include a fixed IP access network 204 that receives data related to multi-mode device 202. Such data can include at least identification data that uniquely classifies and associates multi-mode device 202 with a service-level policy agreement and a home wireless access network 206, for instance. An authentication component 208 that receives the authentication data can thereby identify a home wireless access network (e.g. home wireless access network 206) associated with multi-mode device 202. Furthermore, the data can include authentication data configured to verify a status of a wireless access subscription service associated with multi-mode device 202. A wireless access subscription service status can include service classifications such as, active, inactive, expired, payment overdue etc.

Home wireless access network 206 can be a wireless access network as defined supra and can further store and reference a wireless access subscription service and/or service-level policy agreement associated with multi-mode device 202. Authentication component 208 can transmit the authentication data to home wireless access network 208 thereby enabling such network to identify multi-mode device 202 and reference a status of a wireless access subscription service (e.g. stored on home wireless access network 206) associated therewith. If the wireless access subscription service is classified as active, home wireless access network 208 can verify the authentication data and inform authentication component 206 that a service-level policy agreement exists for multi-mode device 202. Authentication component 206 can then relay such verification to fixed IP access network 204 and specify that service-level policies with multi-mode device 202 be established by a service-level policy agreement.

In accord with an aspect of the subject innovation, home wireless access network 206 can request policy component 210 to transfer at least a portion of the service-level policy agreement to fixed IP access network 204. Similar to policy component 106 described supra, policy component 210 can include physical or virtual data storage elements that can store wireless access-subscription policies associated with various multi-mode devices (e.g. multi-mode device 202). Moreover, policy component 210 can include one or more policy servers containing instruction protocols that facilitate storage, retrieval, back-up and/or recovery of data (e.g. identification data, wireless access-subscription policies, etc.) and transfer of such data between communication networks. Instruction protocols can include requirements for accessing a service-level policy agreement. For example, policy component 210 can require verified authentication data to allow a communication network to retrieve a portion of a service-level policy agreement associated with a device. If home wireless access network 206 verifies and provides authentication data related to multi-mode device 202 to policy component 210, such network can authorize policy component 210 to transfer a portion service-level policy agreement to another network (e.g. fixed IP access network 204). By utilizing at least a portion of the service-level policy agreement related to multi-mode device 202, fixed IP access network 204 can enable or disable predetermined services or policies on a per session basis (e.g. as described supra) and satisfy a wireless access subscriber's expectations. System 200 can therefore, in accord with the subject innovation, transfer a portion of a service-level policy agreement, associated with a home wireless access network, to meet subscriber expectations across fixed IP access and wireless access communication platforms.

Figure 3:
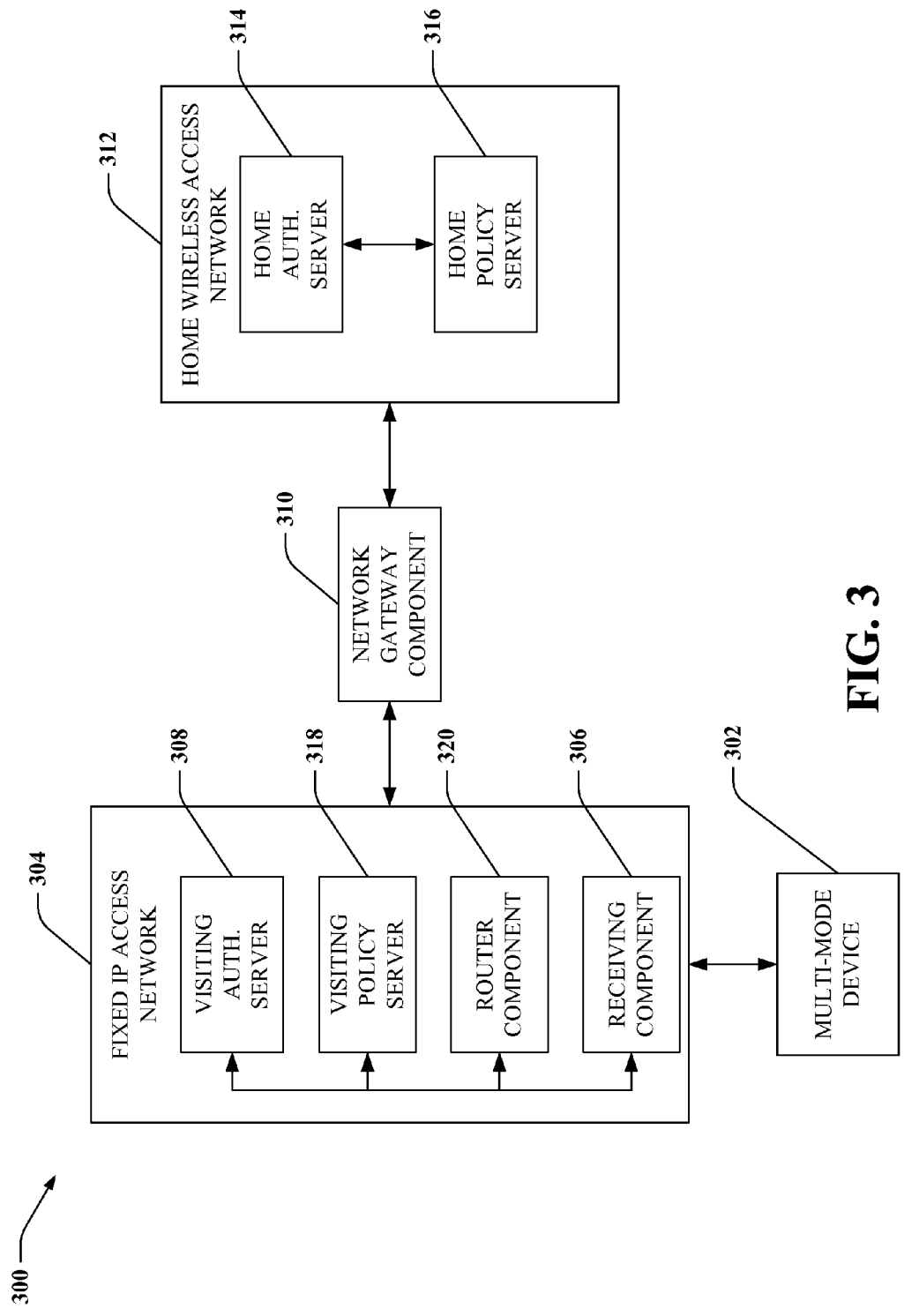
FIG. 3 depicts a block diagram of an example system that enables and/or disables services or service-level policies for data exchange between a multi-mode device and a fixed IP access network according to a portion of a service-level policy agreement.

FIG. 3 depicts a converged wireless/fixed system 300 that facilitates communication between a fixed IP access network and a wireless access network at a service-level in accord with an aspect of the subject innovation. Multi-mode device 302 can be a device that enables connectivity with at least a wireless access network and a fixed IP access network as defined herein. Fixed IP access network 304 can be a communication network that facilitates data exchange between one or more devices by providing an architecture for such data exchange utilizing at least IP addressing and protocols. In particular, fixed IP access network can receive data related to multi-mode device 302. Such data can include classification data associated with a device, e.g., a user ID, device serial number, device identification number, device MAC address, consumer data (e.g. consumer address, name, billing information, credit card information, etc.), a username, a password, a serial code, a wired equivalent privacy (WEP) code, WiFi protected access (WPA) code, a home network associated with a device, routing information for a home network, or like data that can uniquely identify a device and a home wireless access network associated with a device. A receiving component 306 can collect data related to multi-mode device 302 including classification data and the like. Such data is forwarded to visiting authentication server 308 for further handling.

System 300 is configured to enable device authentication between communication networks and communication network architectures (e.g. a fixed IP access network and a wireless access network). Visiting authentication server 308 can connect to a network gateway component 310 for cross-network and cross-architecture data exchange (e.g. communication between different types of networks, an IP network and a wireless access network for example, can be cross-architecture). For example, network gateway component 310 is a device configured to route data between various communication networks, including public switched telephone networks (PSTN), mobile and/or wireless access communication networks and fixed IP access networks as described supra, or satellite communication networks or combinations of the like. Visiting authentication server 308 can identify a home wireless access network and routing information for such network from classification data forwarded by receiving component 306. A data exchange platform between visiting authentication server 308 and a home authentication server 314 is established via network gateway component 310. Visiting authentication server 308 forwards classification data related to multi-mode device 302 to home authentication server 314. Such home authentication server can store and/or access authentication information associated with a communication device related to home wireless access network 312. Authentication information can include a status of a wireless access-subscription, e.g., active, inactive, payment overdue, cancelled etc. If a status of a wireless access-subscription associated with multi-mode device 302 indicates such subscription as active, home authentication server 314 can forward such status to visiting authentication server 308 to indicate that a service-level policy agreement exists for multi-mode device 302.

System 300 can further transfer a service-level policy agreement associated with a multi-mode device 302 from a wireless access network to a fixed IP access network. It is to be appreciated that, in general, a at least a portion of a service-level policy agreement can determine policies for information exchange particular to a multi-mode device or class of multi-mode device (e.g. classes can be based on services, such as VoIP-only, VoIP and data transfer, quality of service parameters such as minimum bandwidth, maximum bit rate, router priority, and the like, local regulations or agreements, or billing rates or combinations thereof as discussed supra). Such policies can include, but are not limited to, quality of service parameters, communication services, or billing information, or combinations thereof (e.g. as described supra). A class of multi-mode device can be based on data exchange policies as well. For instance, devices capable of utilizing certain services (such as VoIP-only, VoIP and data transfer), utilizing levels of quality (such as minimum bandwidth, maximum bit rate, router priority, and the like), subject to certain regulations or agreements or subscribed to billing classifications (monthly rate, per-usage rate etc.), or combinations thereof can all serve as basis for enabling or disabling services or other policies per communication session with fixed IP access network.

If the home authentication server 314 authenticates classification data related to the multi-mode device 302, a home policy server 316 can reference a service-level policy agreement associated with such device. Further, home policy server can transfer at least a portion of policies related to information exchange to a visiting policy server 318. Such policies between a fixed IP access network and a visiting multi-mode device (e.g. multi-mode device 302) can be established by visiting policy server 318, including for instance, as discussed supra. Routing component 320 is a data routing device that can send, receive, schedule, classify, and/or prioritize exchange of data-packet information between communication networks and communication devices. Routing component 320 can be, e.g., an edge router, a core router, a one-armed router, a "LAN switch", or like devices or combinations thereof. Routing component 320 can enforce service-level policies determined by visiting policy server 318 per communication session between multi-mode device 302 and fixed IP access network 304. In effect, routing component 320 is the mechanism by which communication-related policies prescribed by at least a portion of a service-level policy agreement can be enforced for data exchange with a multi-mode device 302.

Figure 4:
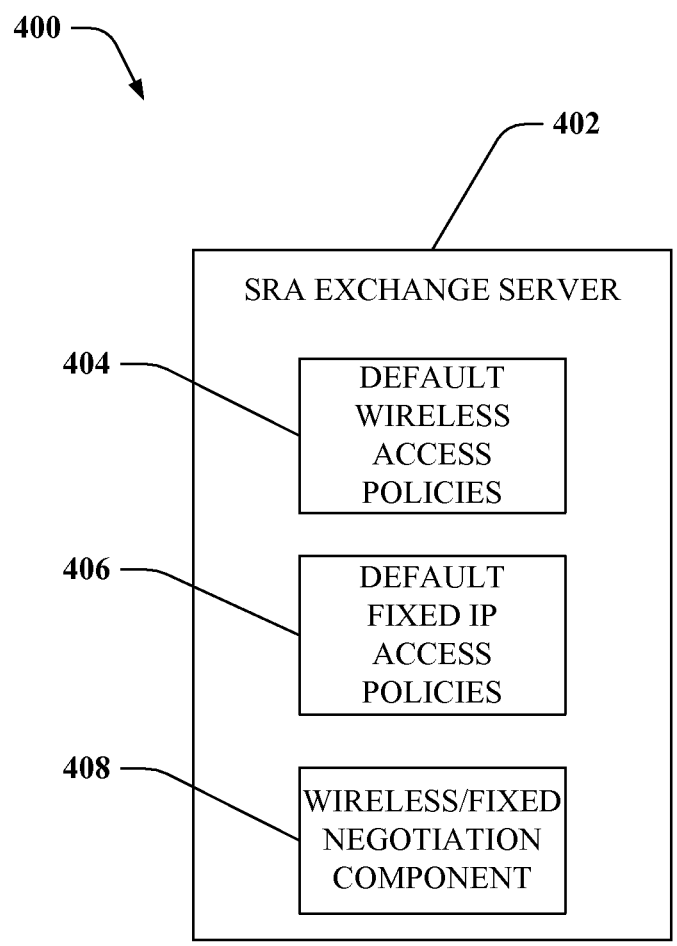
FIG. 4 depicts an example system that dynamically negotiates a service related agreement (SRA) in accordance with a particular aspect of the subject innovation.

FIG. 4 depicts an example system that dynamically negotiates a service-related agreement (SRA) in accordance with a particular aspect of the subject innovation. A SRA can establish agreements that define service-related policy exchange specific to a multi-mode device or classes of multi-mode devices (as described supra) including billing information, or that define a cost related to inter-network data exchange, such as a tariff. For instance, an SRA can enable or disable services or policies applicable to a communication on a per session basis, as described supra (e.g., such as qualities of service, presence of local regulations or agreements governing mobile communication, availability of services such as streaming media or availability of specific medias, and/or billing-related matters applicable to data exchange between subscribers of one network, such as a visiting subscriber, and another network, such as a visited network).

System 400 can dynamically negotiate per session service availability, and quality of service and billing parameters germane to data exchange between a visiting subscriber and a visited network. The subscriber and network can be of differing communication architectures; for instance, a network can be a fixed IP access network and a visiting subscriber can be a wireless access subscriber. Service and billing parameters can include, e.g., data exchange quality such as bandwidth, maximum bit rate, routing priority, and the like and, usage information such as total data transfer (measured, for instance, in megabytes [mb] and/or gigabytes [gb]), total time of data transfer, data exchange services used etc. SRA exchange server 402 includes at least default wireless access provider policies 404, default fixed IP access provider policies 406, and a wireless/fixed negotiation component 408. Alternatively, SRA exchange server 402 can include a connection to at least one data storage device that can store and provide at least the default wireless access policies 404 and/or default fixed IP access policies 406.

Default wireless access policies 404 can define policies for data exchange for voice communication and for other data exchange services (e.g., streaming video, concurrent audio, e-mail, IM, text messaging and the like) established by a service-level policy agreement between a wireless access provider and a subscriber or class of subscribers. Furthermore, default wireless access policies 404 can establish rules for modifying such policies for data exchange, e.g., in order to negotiate an agreement with another network having different default policies. Likewise, default fixed IP access policies 406 can define policies for data exchange related to IP subscription agreements and rules for modifying such policies. Wireless/fixed negotiation component 408 can dynamically moderate an agreement between a fixed IP access provider and a wireless access provider. Such dynamic negotiation can occur, for instance, to moderate between policy defaults if a multi-mode device having default wireless access policies logs onto a network with different default IP policies.

The following example illustrates one aspect of system 400 and is not to be so construed as to limit system 400 to such aspect. For example, a multi-mode device is associated with a service-level policy agreement with a wireless access service provider that establishes a minimum bandwidth of 1 MB/s for voice, video and concurrent audio services. In return, monthly subscription payments and service usage payments are given to the wireless access provider. The monthly subscription payment rate is fixed; the service usage payment rate can vary for each video/concurrent audio service used, and for the total data transferred per usage. If a wireless access multi-mode device visits and registers onto another network, e.g., a fixed IP access network, at least a portion of the service-level policy agreement can be provided to that network in accord with various aspects of the subject innovation. The visited fixed IP access network can have default data exchange policies differing from data exchange policies established in the service-level policy agreement. In such case, wireless/fixed negotiation component 408 can access default wireless access policies 404 and default fixed IP access policies 406, and rules for modifying such defaults. If default fixed IP access policies 406 specify that a maximum bandwidth of 500 KB/s is available for a particular data exchange, for instance, wireless/fixed negotiation component 408 can reference default wireless access policies 404 to determine a rule for insufficient bandwidth. In such case default wireless access policy 404 can establish, for instance, that sub-minimum bandwidth data exchange is permissible, but services requiring greater bandwidth (e.g. video and concurrent audio services) must be de-activated for such communication. Wireless/fixed negotiation component 408 can then establish an SRA specifying these terms, and that data exchange between the wireless access multi-mode device and the fixed IP access network can commence.

SRA exchange server 402 can establish other policies associated with converged network communication (e.g. fixed IP access to wireless access and the like). In addition to the policies illustrated in the foregoing example, an SRA negotiated by wireless/fixed negotiation component 408 can specify a tariff (e.g., a payment to a first network provider for data exchange service provided to a subscriber of a second network provider) and rules for recording and transferring usage information related to billing. SRA exchange server 402 can store such an SRA, which can be referenced by other communication networks to establish policies for subsequent data exchange between a device and those networks.

Figure 5:
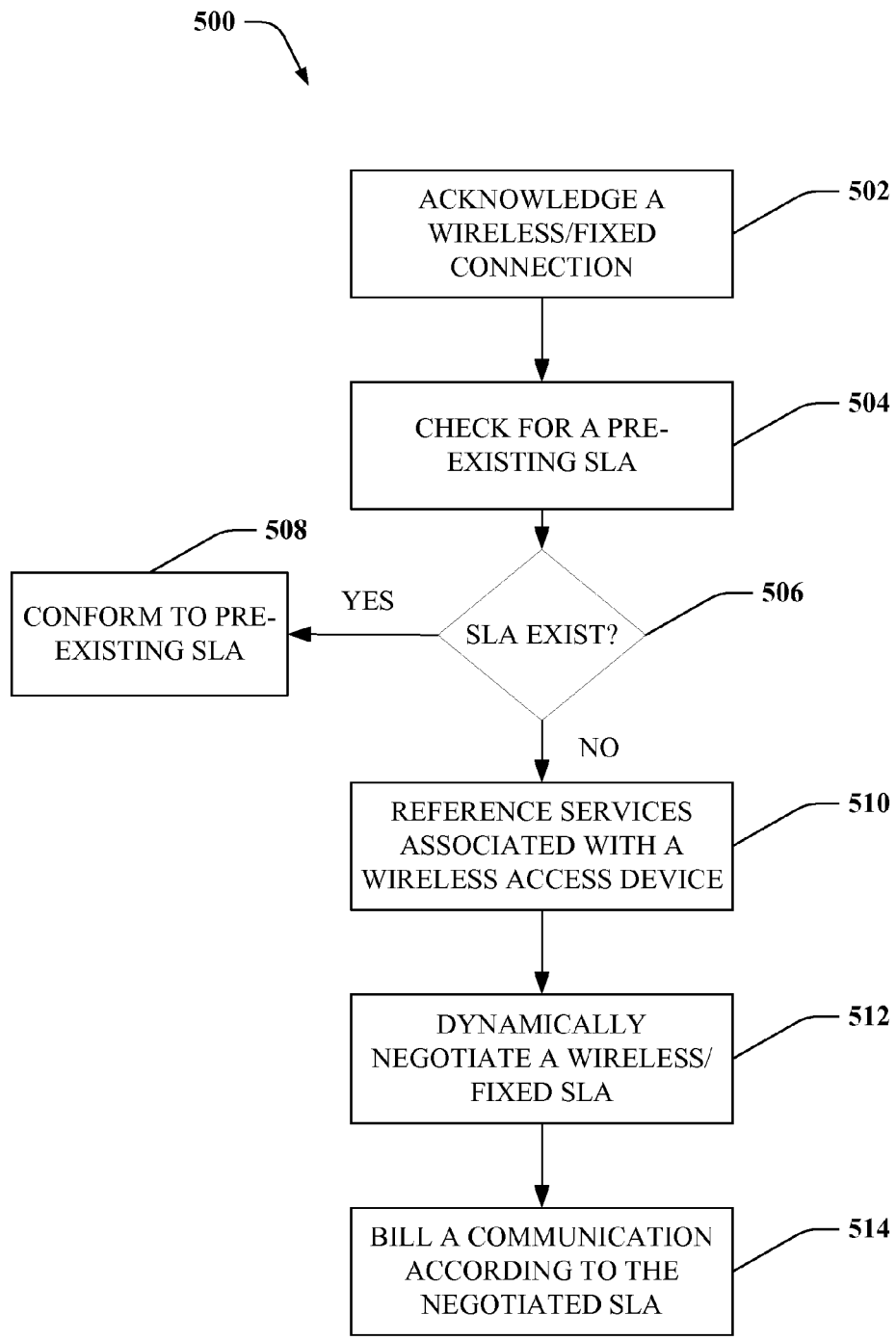
FIG. 5 illustrates a methodology for dynamically negotiating a service level agreement (SLA) in accordance with one aspect of the subject innovation.

FIG. 5 illustrates a methodology for dynamically negotiating a service level agreement (SLA) in accordance with various aspects of the subject innovation. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

As illustrated, methodology 500 can check for a pre-existing SLA between different networks that defines per session services, billing information, tariffs, etc. applicable to communication with a multi-mode device. Furthermore, methodology 500 can dynamically negotiate an SLA if no pre-existing SLA is found. It should be appreciated that methodology 500 can be applied to two or more networks of differing architecture, e.g., a fixed IP access network, a wireless access communication network, a satellite network, and the like. At 502, an acknowledgement of a wireless/fixed connection is made. Such connection can be, for instance, via a gateway routing device facilitating communication between a fixed IP access network and a wireless access communication network. Acknowledgement can take the form of data or a portion of data exchanged from one network to another or from one or more networks to an intermediary component (e.g. a gateway routing device).

At 504, existence of an SLA between a wireless access and a fixed IP access network is checked for. The SLA can establish policies for data exchange on a per session basis to be enforced for communication between a first network and subscribers of a second network. Such standards can include applicable data exchange services (e.g. streaming video, concurrent audio, text messaging, IM, e-mail, and the like) and a data quality (e.g. minimum bandwidth, maximum bit rate, routing priority, etc.) associated therewith, tariff information, local regulation or agreement information, or usage information related to billing, or combinations thereof.

At 506, a determination is made as to whether an SLA exists between two networks. If so, subsequent data exchange between subscribers of those networks can be performed in accord with the pre-existing SLA. If no pre-existing SLA exists, or a pre-existing SLA is inapplicable to a particular data exchange, methodology 500 proceeds to act 510 where services associated with a wireless access multi-mode device are referenced. Such services can include the policies of data exchange described supra. At 512, an SLA can be dynamically negotiated between a wireless access network and a fixed IP access network based on at least the services associated with the wireless access multi-mode device, the resources available to a fixed IP access network, pre-established rules for negotiating policy agreements, and rules for handling any policy conflicts or potential policy conflicts between networks. Such SLA can establish policies of data exchange for a wireless access subscriber or class of subscribers roaming between networks (e.g. classes can be based on services, such as VoIP-only, VoIP and data transfer, quality of service parameters such as minimum bandwidth, maximum bit rate, router priority, and the like, local regulations or agreements relating to communication service availability, or billing rates, or combinations thereof). At 514, a tariff can be billed from a first network providing services to a subscriber of a second network. Moreover, usage information related to the data exchange between the subscriber and the first network can be transferred to the second network for billing purposes.

Figure 6:
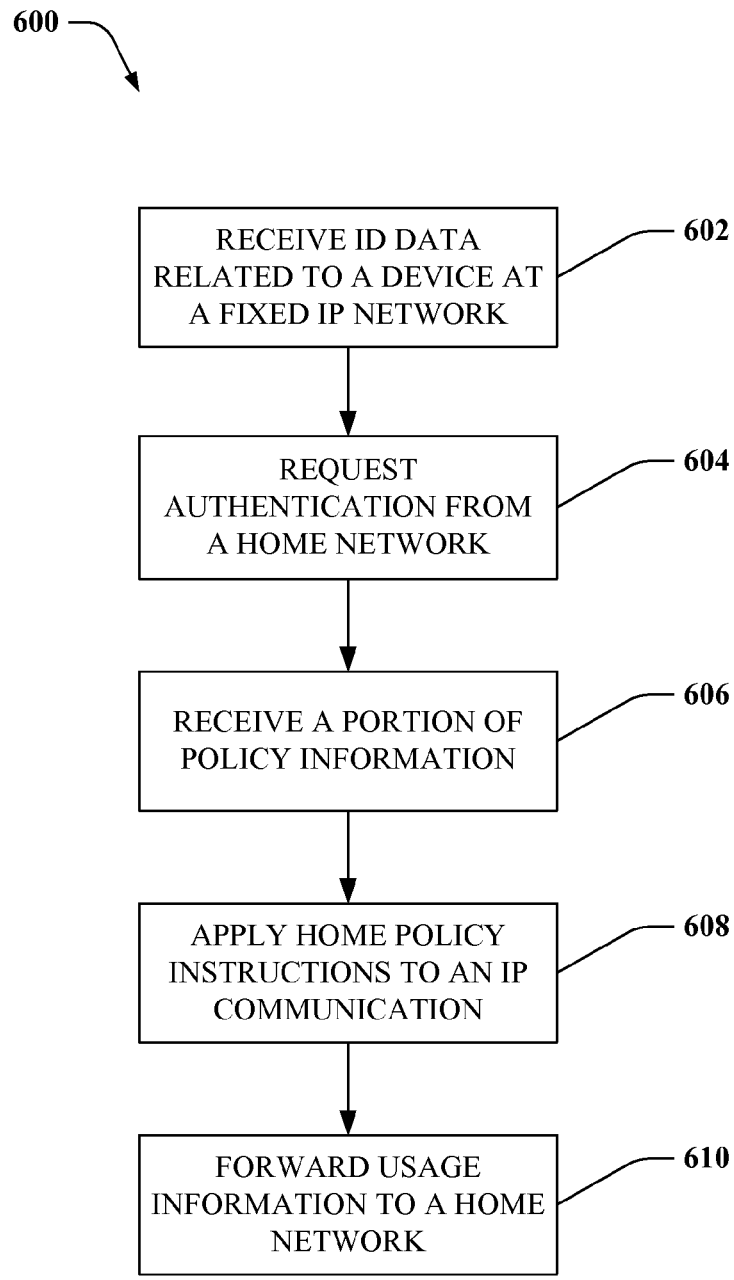
FIG. 6 illustrates an example methodology for receiving and applying a portion of a service-level policy agreement to information exchange between a multi-mode device and a fixed IP access network in accord with an aspect of the subject innovation.

FIG. 6 illustrates an example methodology 600 for receiving and applying a portion of a service-level policy agreement to data exchange between a multi-mode device and a fixed IP access network in accord with an aspect of the subject innovation. At 602 ID data related to a multi-mode device are received at a fixed IP access network. The ID data can include a user ID, device serial number, device identification number, device MAC address, consumer data (e.g. consumer address, name, billing information, credit card information, etc.), and/or any suitable data that can uniquely identify a multi-mode device, consumer associated with a device, a home network associated with a device, or routing information associated with a home network, or combinations thereof. Such data can be received from the multi-mode device or from another component that can exchange data with the fixed IP access network. The multi-mode device can have a home wireless access network associated with it, and can be adapted to participate in data exchange between networks of differing architecture (e.g. wireless access communication networks, fixed IP access networks, satellite networks, and the like).

At 604, authentication from a home network is requested. Identification and routing information for the home network can be obtained from the ID data (supra). The home network can be a network associated with a multi-mode device (e.g. a wireless access network or an IP network). Furthermore, a home network subscription related to a multi-mode device can exist and can be the subject of the authentication request of act 604. Typically, a home network subscription can specify service-level policies applicable to data exchange between a home network and a multi-mode device and/or between a non-home network and a multi-mode device. Such policies can include, but are not limited to, quality of service parameters, applicable data exchange services, local regulations or agreements, or usage information related to billing, or combinations thereof applicable to enabling or disabling services or other policies on a per session basis.

At 606, at least a portion of policy instructions is received. Such policy instructions can be received from the home network or an intermediary component as a result of a request for authentication. It is to be appreciated that a portion of policy instructions can be requested and received, and that such portion can further be sufficient to effectuate the data exchange between the multi-mode device and the fixed IP access network in accord with an aspect of the subject innovation. It is also to be appreciated that the policy instructions or portion thereof can be among service-level policy specified in a portion of the home network subscription.

At 608, home policy instructions are applied to at least a portion of an IP data exchange; the IP data exchange transferring data to and/or from the multi-mode device and the fixed IP access network and beyond (e.g. to and from the Internet or another communication network accessible via the fixed IP access network). At 610, at least a portion of usage information related to billing is transferred to the home network. Such usage information can specify application data services used in a data exchange (e.g. streaming video, concurrent audio, e-mail, IM, text massage, and the like), a level of quality associated with a data exchange (e.g. a minimum bandwidth, a maximum bit rate, a router priority, etc.), or a billing classification related thereto or combinations thereof. Further, usage information can include a tariff payable by the home network to the fixed IP access network for providing services to a subscriber of the home network.

Figure 7:
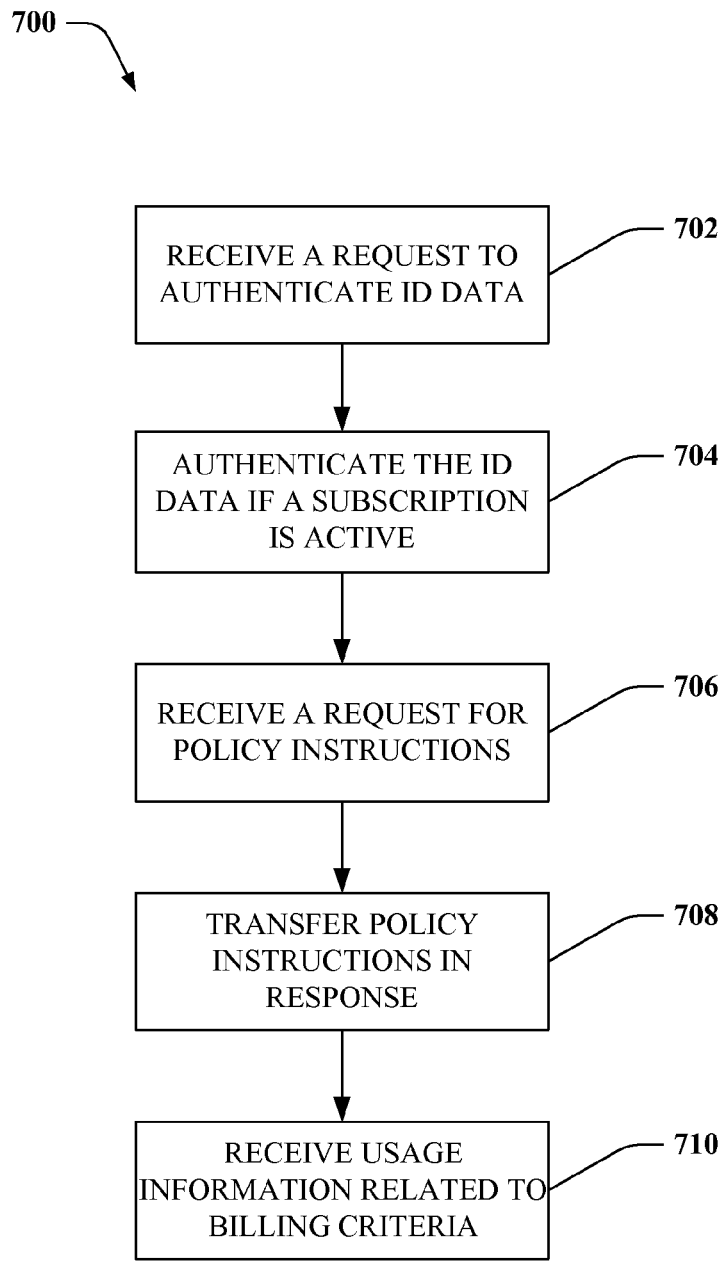
FIG. 7 illustrates an example methodology for authenticating and transferring a portion of a service-level policy agreement in accord with a further aspect of the innovation.

FIG. 7 illustrates a methodology 700 in accord with an aspect of the subject innovation. As depicted, methodology 700 facilitates authenticating and transferring at least a portion of a service-level policy agreement in accord with an aspect of the subject innovation. At 702, a request is received to authenticate ID data. The ID data can be as described supra and can uniquely identify a multi-mode device associated with a network of a first architecture (e.g. a wireless access network), a consumer associated with a device, a home network associated with a device, or routing information associated with a home network, or combinations thereof. The request can be received, for example, at a home network associated with a multi-mode device; such multi-mode device can further have a wireless access-subscription with the home network. In addition, the request can originate from a network of a second architecture (e.g. a fixed IP access network) that receives data related to the multi-mode device, a component of such network, a multi-mode device, or combinations thereof.

At 704, the ID data can be authenticated if a subscription associated with the multi-mode device is active. The subscription can be an agreement between the home wireless access network and the multi-mode device establishing policies of data exchange for communication with such device, as described herein. A subscription can be active if, for example, stipulations in the subscription are current (e.g., still applicable to a provider and a subscriber), payment is current or the like. If such subscription is active, ID data can be authenticated (e.g., in response to the receiving the request at act 702). At 706, a request is received for policy instructions that can include, for instance, policy instructions associated with an active subscription. Such policy instructions can specify policies for data exchange applicable to communication between a multi-mode device and a communication network as defined herein. At 708, at least a portion of policy instructions is transferred in response to receiving the request at act 706. The portion of policy instructions can be transferred to another network (e.g., a fixed IP access network or a wireless access network), or a device that facilitates communication between networks (e.g., a gateway routing device) and/or the like.

At 710, at least a portion of usage information related to billing criteria is received (e.g., from a fixed IP access network or a wireless access network). Such usage information can specify application data services used in a data exchange (e.g. streaming video, concurrent audio, e-mail, IM, text massage, and the like), a level of quality associated with a data exchange (e.g. a minimum bandwidth, a maximum bit rate, a router priority, etc.), or a billing classification related thereto or combinations thereof. Further, usage information can include a tariff payable by the home network to a fixed IP access network for providing services to a subscriber of the home network.

Figure 8:
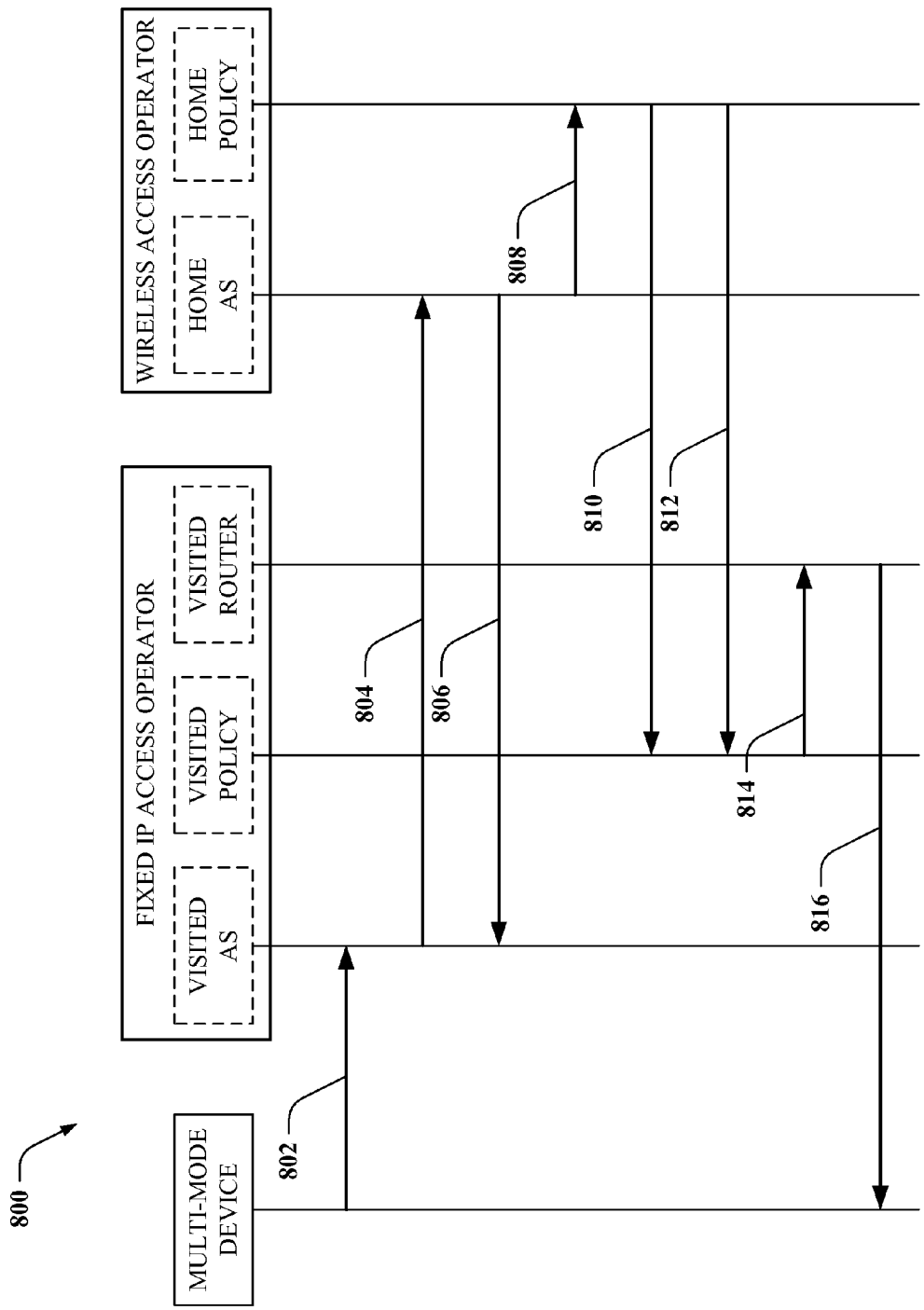
FIG. 8 illustrates an example methodology for establishing service-level policies on a per session basis between a fixed IP access network and a multi-mode device in accord with a particular aspect of the innovation.

FIG. 8 depicts an exemplary methodology 800 for establishing information exchange policies between a fixed IP access network and a multi-mode device in accord with particular aspects of the subject innovation. It is to be appreciated, for the description of methodology 800 only, that all acts referencing a 'visited' component refer to a component associated with a fixed IP access network, and all acts referring to a 'home' component refer to a component associated with a wireless access network. At 802, a visited authentication server (visited AS) associated with a fixed IP access network receives data related to a multi-mode device. The data can, for instance, uniquely identify the multi-mode device, specify a home network associated with the device, and specify routing information necessary to exchange information with such a home network. At 804, the visited authentication server forwards an authorization request to a home authentication server (home AS). The authorization request can be transmitted utilizing information within a portion of the data related to the multi-mode device. Further, the authorization request can be to verify whether a subscription policy related to the multi-mode device exists. At 806, the home authentication server responds to the authentication request of act 804, verifying whether a wireless access-subscription related to the multi-mode device exists. If a subscription policy related to the multi-mode device exists, the response will be in the affirmative; otherwise, the response will be in the negative. If the response is in the negative, the methodology 800 ends at act 806. Otherwise methodology 800 continues from 806 to act 808.

At 808, the home authentication server references a home policy server (home policy) to retrieve at least a portion of subscription information associated with a multi-mode device. The subscription information can specify information exchange policies applicable to a communication session and/or sessions between a multi-mode device and a communication network. Such policies can include, but are not limited to, quality of service parameters, communication services, or billing information, local regulations or agreements, or combinations thereof (e.g. as described supra). At 810, the home policy server checks to determine whether a pre-existing SLA exists between the home policy server and a visited policy server (visited policy). If not, methodology 800 can dynamically negotiate an SLA applicable to data exchange with a multi-mode device or class of multi-mode device (e.g., where classes can be based on services, such as VoIP-only, VoIP and data transfer, quality of service parameters such as minimum bandwidth, maximum bit rate, router priority, and the like, or billing rates, or local regulations or agreements affecting available services, or combinations thereof). The SLA can be negotiated at last in part based on information exchange policies to be enforced for a communication session, resources available for such communication, and/or non-conflicting policies associated with visited and home networks.

At 812, policies are exchanged between the home policy server and the visited policy based on a pre-existing SLA, a dynamically negotiated SLA, or the like, to effectuate at least a portion of wireless access services for an IP data exchange (e.g., the home policy server can forward at least a portion of subscription information associated with one or more multi-mode devices and the visited policy can receive at least a portion of the subscription information). At 814, the visited policy can instruct a visited router to enforce at last a portion of a service-level policy agreement in regard to data exchange between the multi-mode device and a fixed IP access network associated with the visited router. Such enforcement can be based on, for example, a determination that policies specified by the service-level policy agreement received from the home network do not conflict with policies native to the visited network. It should be appreciated that the visited router can be a data routing device that can send, receive, schedule, classify, and/or prioritize exchange of data-packet information between communication networks and communication devices, e.g., an edge router, a core router, a one-armed router, a "LAN switch", or like devices or combinations thereof. At 816, data exchange, for example in the form of streaming media such as VoIP, streaming video, etc. as described herein and the like, commences and/or continues between the multi-mode device and the fixed IP access network and beyond (e.g. to and from the Internet or another communication network accessible via the fixed IP access network).

Figure 9:
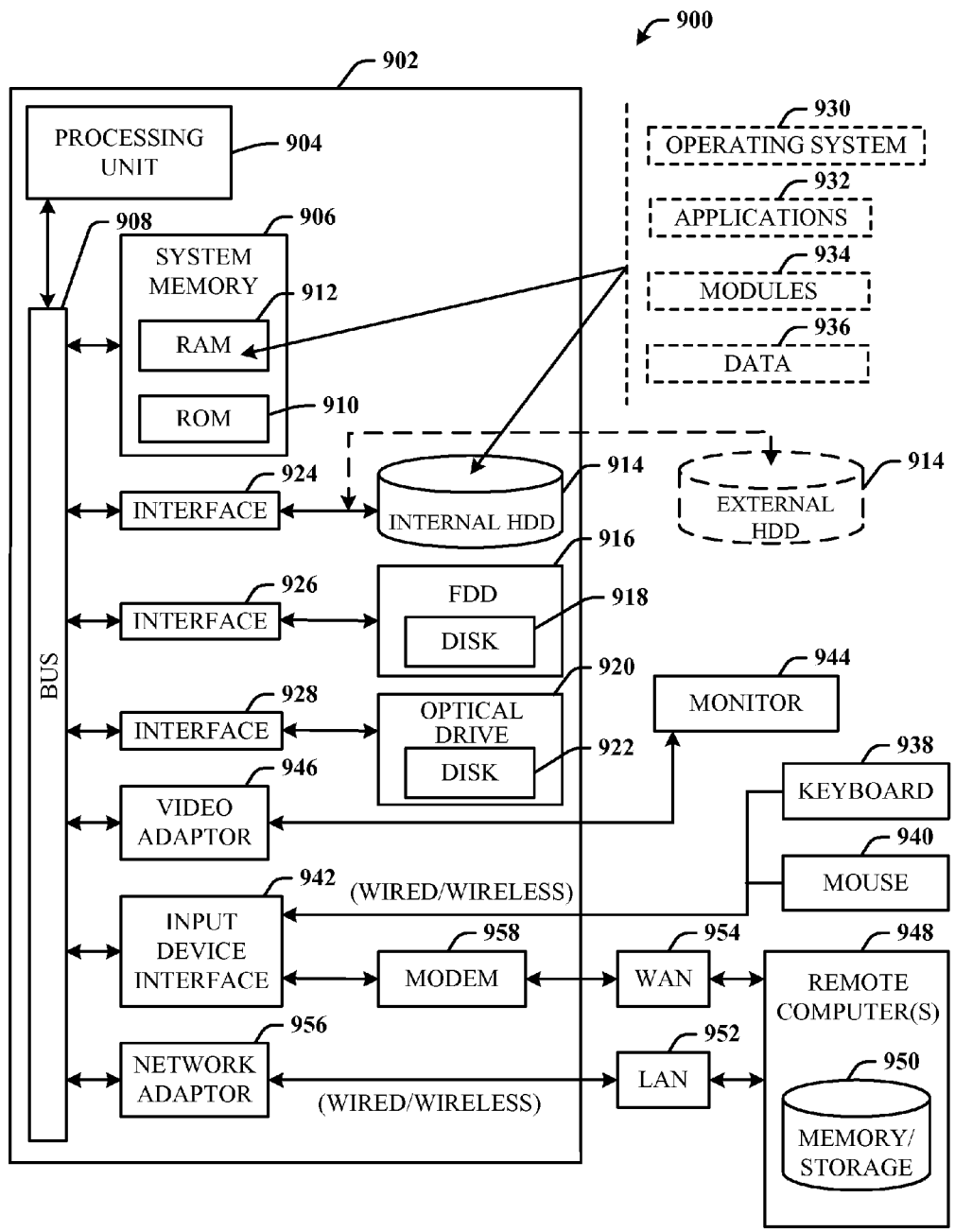
FIG. 9 depicts a block diagram of a sample computing environment such as a multi-mode device or a remote device as described herein.

Referring now to FIG. 9, there is illustrated a block diagram of an example computing device such as a mobile device or a remote device described herein. In order to provide additional context for various aspects thereof, FIG. 9 and the following discussion are intended to provide a brief, general description of a suitable computing environment 900 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the exemplary environment 900 for implementing various aspects includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as a DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 912, including an operating system 930, one or more application programs 932, other program modules 934 and program data 936. All or portions of the operating system, applications, modules, and/or data can also be cached in the RAM 912. It is to be appreciated that the innovation can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adaptor 956 may facilitate wired or wireless communication to the LAN 952, which may also include a wireless access point disposed thereon for communicating with the wireless adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and Bluetooth™ wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out; anywhere within the range of a base station. WiFi networks use radio technologies called IEEE 802.11(a, b, g, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 10:
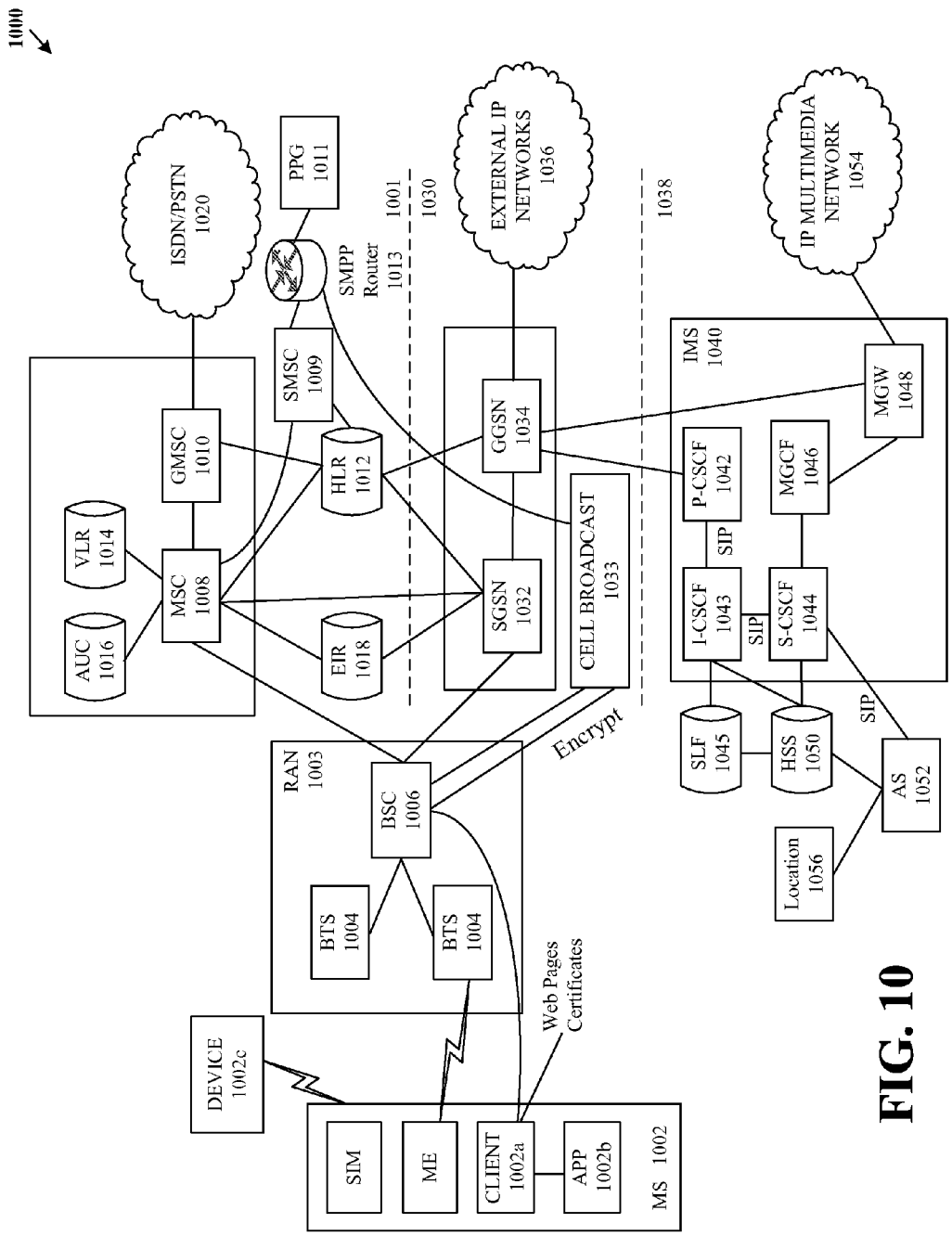
FIG. 10 illustrates an example network architecture that can be employed in connection with various aspects associated with the claimed subject matter.

Now turning to FIG. 10, such figure depicts a GSM/GPRS/IP multimedia network architecture 1000 that includes a GSM core network 1001, a GPRS network 1030 and an IP multimedia network 1038. The GSM core network 1001 includes a Mobile Station (MS) 1002, at least one Base Transceiver Station (BTS) 1004 and a Base Station Controller (BSC) 1006. The MS 1002 is physical equipment or Mobile Equipment (ME), such as a mobile phone or a laptop computer that is used by mobile subscribers, with a Subscriber identity Module (SIM). The SIM includes an International Mobile Subscriber Identity (IMSI), which is a unique identifier of a subscriber. The MS 1002 includes an embedded client 1002a that receives and processes messages received by the MS 1002. The embedded client 1002a may be implemented in JAVA and is discuss more fully below.

The embedded client 1002a communicates with an application 1002b that provides services and/or information to an end user. One example of the application may be navigation software that provides near real-time traffic information that is received via the embedded client 1002*a* to the end user. The navigation software may provide road conditions, suggest alternate routes, etc. based on the location of the MS 1002. Those of ordinary skill in the art understand that there are many different methods and systems of locating an MS 1002.

Alternatively, the MS 1002 and a device 1002*c* may be enabled to communicate via a short-range wireless communication link, such as BLUETOOTH. For example, a BLUETOOTH SIM Access Profile may be provided in an automobile (e.g., device 1002*c*) that communicates with the SIM in the MS 1002 to enable the automobile's communications system to pull information from the MS 1002. The BLUETOOTH communication system in the vehicle becomes an "embedded phone" that employs an antenna associated with the automobile. The result is improved reception of calls made in the vehicle. As one of ordinary skill in the art would recognize, an automobile is one example of the device 1002*c*. There may be an endless number of devices 1002*c* that use the SIM within the MS 1002 to provide services, information, data, audio, video, etc. to end users.

The BTS 1004 is physical equipment, such as a radio tower, that enables a radio interface to communicate with the MS. Each BTS may serve more than one MS. The BSC 1006 manages radio resources, including the BTS. The BSC may be connected to several BTSs. The BSC and BTS components, in combination, are generally referred to as a base station (BSS) or radio access network (RAN) 1003.

The GSM core network 1001 also includes a Mobile Switching Center (MSC) 1008, a Gateway Mobile Switching Center (GMSC) 1010, a Home Location Register (HLR) 1012, Visitor Location Register (VLR) 1014, an Authentication Center (AuC) 1016, and an Equipment Identity Register (EIR) 1018. The MSC 1008 performs a switching function for the network. The MSC also performs other functions, such as registration, authentication, location updating, handovers, and call routing. The GMSC 1010 provides a gateway between the GSM network and other networks, such as an Integrated Services Digital Network (ISDN) or Public Switched Telephone Networks (PSTNs) 1020. In other words, the GMSC 1010 provides interworking functionality with external networks.

The HLR 1012 is a database or component(s) that comprises administrative information regarding each subscriber registered in a corresponding GSM network. The HLR 1012 also includes the current location of each MS. The VLR 1014 is a database or component(s) that contains selected administrative information from the HLR 1012. The VLR contains information necessary for call control and provision of subscribed services for each MS currently located in a geographical area controlled by the VLR. The HLR 1012 and the VLR 1014, together with the MSC 1008, provide the call routing and roaming capabilities of GSM. The AuC 1016 provides the parameters needed for authentication and encryption functions. Such parameters allow verification of a subscriber's identity. The EIR 1018 stores security-sensitive information about the mobile equipment.

A Short Message Service Center (SMSC) 1009 allows one-to-one Short Message Service (SMS) messages to be sent to/from the MS 1002. A Push Proxy Gateway (PPG) 1011 is used to "push" (e.g., send without a synchronous request) content to the MS 1002. The PPG 1011 acts as a proxy between wired and wireless networks to facilitate pushing of data to the MS 1002. A Short Message Peer to Peer (SMPP) protocol router 1013 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1002 sends a location update including its current location information to the MSC/VLR, via the BTS 1004 and the BSC 1006. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 1030 is logically implemented on the GSM core network architecture by introducing two packet-switching network nodes, a serving GPRS support node (SGSN) 1032, a cell broadcast and a Gateway GPRS support node (GGSN) 1034. The SGSN 1032 is at the same hierarchical level as the MSC 1008 in the GSM network. The SGSN controls the connection between the GPRS network and the MS 1002. The SGSN also keeps track of individual MS's locations and security functions and access controls.

A Cell Broadcast Center (CBC) 1033 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1034 provides a gateway between the GPRS network and a public packet network (PDN) or other IP networks 1036. That is, the GGSN provides interworking functionality with external networks, and sets up a logical link to the MS through the SGSN. When packet-switched data leaves the GPRS network, it is transferred to an external TCP-IP network 1036, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time. A class B MS can attach to the network for both GPRS services and GSM services simultaneously. However, a class B MS does not support simultaneous operation of the GPRS services and GSM services. That is, a class B MS can only use one of the two services at a given time. A class C MS can attach for only one of the GPRS services and GSM services at a time. Simultaneous attachment and operation of GPRS services and GSM services is not possible with a class C MS.

A GPRS network 1030 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call)

when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while received data and vice versa.

The IP multimedia network 1038 was introduced with 3GPP Release 5, and includes an IP multimedia subsystem (IMS) 1040 to provide rich multimedia services to end users. A representative set of the network entities within the IMS 1040 are a call/session control function (CSCF), a media gateway control function (MGCF) 1046, a media gateway (MGW) 1048, and a master subscriber database, called a home subscriber server (HSS) 1050. The HSS 1050 may be common to the GSM network 1001, the GPRS network 1030 as well as the IP multimedia network 1038.

The IP multimedia system 1040 is built around the call/session control function, of which there are three types: an interrogating CSCF (I-CSCF) 1043, a proxy CSCF (P-CSCF) 1042, and a serving CSCF (S-CSCF) 1044. The P-CSCF 1042 is the MS's first point of contact with the IMS 1040. The P-CSCF 1042 forwards session initiation protocol (SIP) messages received from the MS to an SIP server in a home network (and vice versa) of the MS. The P-CSCF 1042 may also modify an outgoing request according to a set of rules defined by the network operator (for example, address analysis and potential modification).

The I-CSCF 1043 forms an entrance to a home network and hides the inner topology of the home network from other networks and provides flexibility for selecting an S-CSCF. The I-CSCF 1043 may contact a subscriber location function (SLF) 1045 to determine which HSS 1050 to use for the particular subscriber, if multiple HSSs 1050 are present. The S-CSCF 1044 performs the session control services for the MS 1002. This includes routing originating sessions to external networks and routing terminating sessions to visited networks. The S-CSCF 1044 also decides whether an application server (AS) 1052 is required to receive information on an incoming SIP session request to ensure appropriate service handling. This decision is based on information received from the HSS 1050 (or other sources, such as an application server 1052). The AS 1052 also communicates to a location server 1056 (e.g., a Gateway Mobile Location Center (GMLC)) that provides a position (e.g., latitude/longitude coordinates) of the MS 1002.

The HSS 1050 contains a subscriber profile and keeps track of which core network node is currently handling the subscriber. It also supports subscriber authentication and authorization functions (AAA). In networks with more than one HSS 1050, a subscriber location function provides information on the HSS 1050 that contains the profile of a given subscriber.

The MGCF 1046 provides interworking functionality between SIP session control signaling from the IMS 1040 and ISUP/BICC call control signaling from the external GSTN networks (not shown). It also controls the media gateway (MGW) 1048 that provides user-plane interworking functionality (e.g., converting between AMR- and PCM-coded voice). The MGW 1048 also communicates with other IP multimedia networks 1054.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of such matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a memory to store computer-executable instructions; and
   a processor, communicatively coupled to the memory, that facilitates execution of the computer executable instructions to perform operations, comprising:
   receiving policy data representative of a portion of a service-level policy agreement associated with a wireless access provider identity and a subscriber identity that is associated with a multi-mode device, wherein the portion represents a default service level policy specifying a data transfer service associated with the wireless access provider identity; and
   in response to determining that the default service level policy differs from an access policy represented by access policy data associated with a device of a network that facilitates internet protocol based communications, facilitating a negotiation of service related agreement data representing a condition for facilitating establishing a communication, by the multi-mode device, to the device of the network.

2. The system of claim 1, wherein the default service level policy specifies the data transfer service based on usage information related to a billing account.

3. The system of claim 1, wherein the operations further comprise:
   facilitating reception of identification data related to the multi-mode device by the device of the network.

4. The system of claim 1, wherein the operations further comprise:
   facilitating regulation of policies applicable to communication between the multi-mode device and the device of the network on a per session basis.

5. The system of claim 1, wherein the operations further comprise:
   facilitating enforcement of the portion of the service-level policy agreement, wherein the portion is associated with a portion of data exchanged between the multi-mode device and the device of the network.

6. The system of claim 1, wherein the multi-mode device comprises a dual-mode cellular and an internet protocol communication device.

7. A method, comprising:
   determining, by a system including a processor, whether a default service level agreement associated with a network that facilitates internet protocol based communications and a wireless network associated with a multi-mode device has been created; and
   in response to determining, by the system, a deficiency of the default service level agreement, facilitating, by the system based on a pre-established rule for negotiating a policy agreement, a negotiation of service level agreement information associated with the network that facilitates the internet protocol based communications and the wireless network associated with the multi-mode device, wherein the service level agreement information represents an information exchange policy specifying a data service provided to the multi-mode device via the network.

8. The method of claim 7, further comprising:
facilitating, by the system, a communication between a device of the network that facilitates the internet protocol based communications and the multi-mode device on a per session basis based on the information exchange policy.

9. The method of claim 7, further comprising:
establishing a tariff associated with a communication between a device of the network that facilitates the internet protocol based communications and the multi-mode device.

10. A method, comprising:
requesting, by a system, authentication of a subscription of a home network related to a multi-mode device;
receiving, by the system, a service-level policy instruction from a device of the home network in response to the requesting of the authentication, wherein the instruction represents a default access policy specifying a data transfer service associated with the subscription of the home network related to the multi-mode device; and
in response to determining, by the system, that a default access policy of a network associated with internet protocol based communications is distinct from the service-level policy instruction, modifying, by the system, service level agreement information referencing a condition for facilitating establishing a communication, by the multi-mode device, to a device of the network.

11. The method of claim 10, further comprising:
facilitating, by the system, application of the service-level policy instruction to an internet protocol data exchange.

12. The method of claim 10, further comprising:
transferring, by the system, usage information related to an internet protocol data exchange between the multi-mode device and the device of the home network.

13. A method, comprising:
verifying, by a system including a processor, that a service-level policy agreement related to a multi-mode device associated with a home wireless network has been created;
in response to determining, by the system, that a default access policy of a network facilitating internet protocol based communications is distinct from another access policy represented by the service-level policy agreement, facilitating, by the system, a modification of a portion of the service-level policy agreement based on a rule specifying the modification; and
forwarding, by the system, policy-related information to a device of the network to facilitate an internet protocol data exchange between the multi-mode device and the device of the network.

14. The method of claim 13, further comprising:
facilitating, by the system, reception of identification data related to the multi-mode device by a home authentication server device.

15. The method of claim 14, further comprising:
receiving, by the system, a request for authentication of the identification data from a visited authentication server device.

16. The method of claim 15, further comprising:
authenticating, by the system, the identification data in response to determining that a subscription associated with the multi-mode device is active.

17. The method of claim 13:
facilitating, by the system, negotiating service level agreement information with a visited policy server device for establishment of policies for data transmission applicable to internet protocol data exchange.

18. The method of claim 13, further comprising:
facilitating, by the system, enforcement of the service-level policy agreement for data exchange between the multi-mode device and the device of the network.

19. The method of claim 13, further comprising:
receiving, by the system, usage information related to a communication associated with the device of the network.

20. The system of claim 1, wherein the default service level policy defines a quality of service parameter.

21. The system of claim 20, wherein the quality of service parameter includes a data transfer bandwidth.

22. The method of claim 7, further comprising:
accessing, by the system, information representing a default policy of the wireless network;
accessing, by the system, a rule for modifying the information; and
specifying, by the system, a term of the service level agreement based on the rule and the information.

23. The system of claim 1, wherein the operations further comprise:
establishing the service related agreement data including information representing a modified default access policy.

24. The method of claim 10, further comprising:
establishing, by the system, the service level agreement information for facilitating a data exchange between the multi-mode device and a network device of the network associated with the internet protocol based communications.

\* \* \* \* \*